US012764022B2

(12) United States Patent
Wall et al.

(10) Patent No.: US 12,764,022 B2
(45) Date of Patent: Oct. 13, 2026

(54) USER DEFINED SYNTHETIC MONITOR EXECUTION ENVIRONMENT

(71) Applicant: Hewlett Packard Enterprise Development LP, Spring, TX (US)

(72) Inventors: Gary C. Wall, Allen, TX (US); Kevin Johnson, Mississauga (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 187 days.

(21) Appl. No.: 18/808,834

(22) Filed: Aug. 19, 2024

(65) Prior Publication Data

US 2026/0052068 A1 Feb. 19, 2026

(51) Int. Cl.
*G06F 15/173* (2006.01)
*H04L 41/0681* (2022.01)
*H04L 41/0869* (2022.01)

(52) U.S. Cl.
CPC ...... *H04L 41/0869* (2013.01); *H04L 41/0681* (2013.01)

(58) Field of Classification Search
CPC ........................ H04L 41/0869; H04L 41/0681
See application file for complete search history.

(56) References Cited

U.S. PATENT DOCUMENTS

| | | | | |
|---|---|---|---|---|
| 2012/0008509 | A1* | 1/2012 | Myers | H04W 24/06 370/252 |
| 2017/0064021 | A1* | 3/2017 | Serebro | H04M 15/44 |
| 2017/0315795 | A1* | 11/2017 | Keller | G06F 11/3006 |
| 2018/0324204 | A1* | 11/2018 | McClory | G06F 9/5027 |

* cited by examiner

*Primary Examiner* — Padma Mundur
(74) *Attorney, Agent, or Firm* — Slater Matsil, LLP

(57) ABSTRACT

According to an implementation, a computer system for synthetic monitoring of a service is provided. The computer system includes a non-transitory computer-readable storage media configured to store programming instructions; and a processor coupled to the non-transitory computer-readable storage media, wherein the programming instructions, when executed by the processor, cause the processor to receive a container image to configure a customized execution environment for executing a simulation of an interaction with the service, configure the customized execution environment according to the container image, execute, in the customized execution environment, the simulation of the interaction with the service to evaluate a functionality of the service, and generate an alert in response to detecting a failure related to executing the simulation of the interaction with the service.

20 Claims, 5 Drawing Sheets

USER DEFINED SYNTHETIC MONITOR EXECUTION ENVIRONMENT

BACKGROUND

Cloud-based services refer to IT resources offered over the Internet or a dedicated network by service providers to their customers. These services encompass a variety of offerings, including website hosting and browser-based interfaces for functions like employee benefits management.

Typically, cloud computing involves using a network of remote servers hosted online to store, manage, and process data instead of relying on local servers or personal computers. Companies that provide these cloud computing services are known as cloud providers. The spectrum of cloud-based services is broad, extending from complete applications and development platforms to servers, storage solutions, and virtual desktops.

Cloud providers are dedicated to maintaining a positive user experience for their cloud-based products and services. To this end, they actively monitor the performance of these offerings to detect and address any problems that arise swiftly. This proactive approach to problem resolution helps ensure the services function optimally for the end users.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
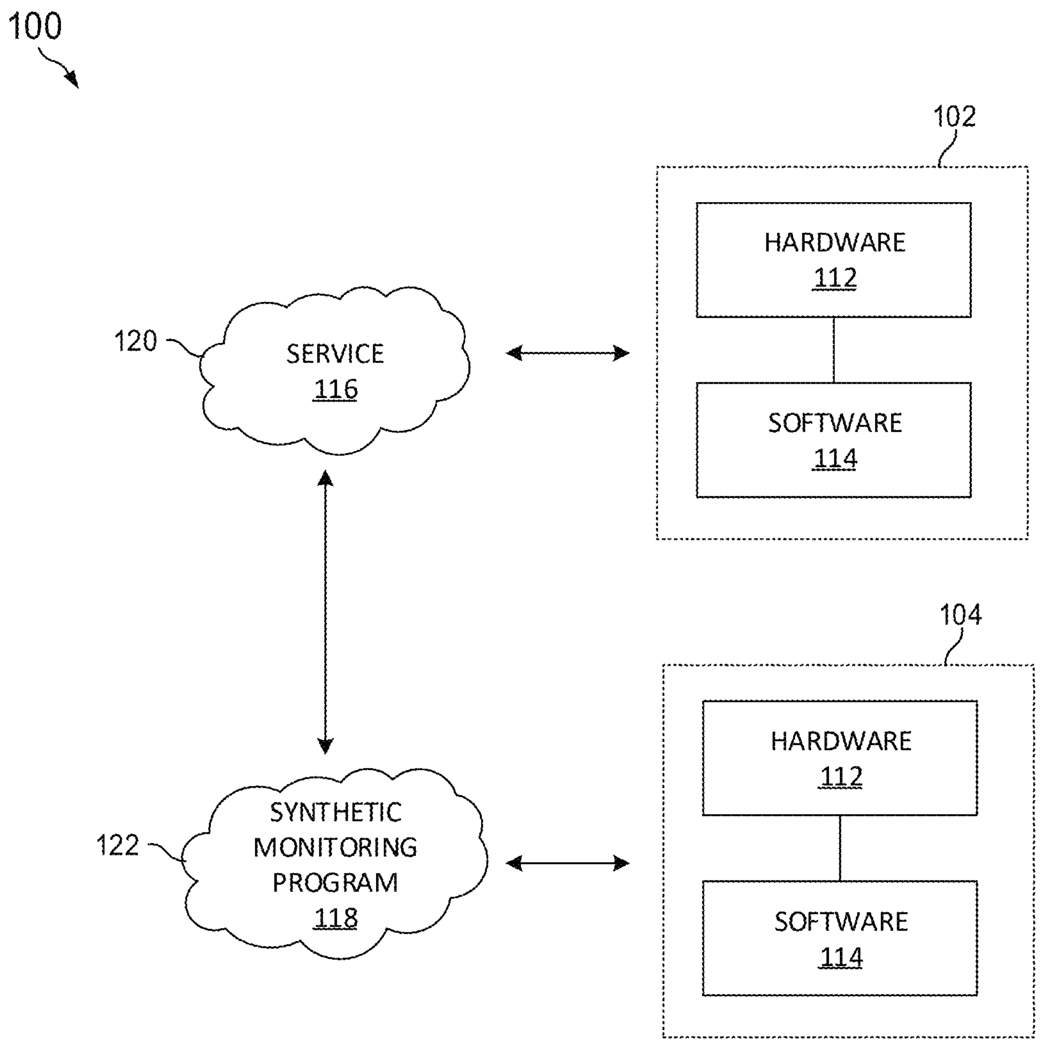
FIG. 1 is a block diagram of an example cloud-based system.

The following disclosure provides many different examples for implementing different features. Specific examples of components and arrangements are described below to simplify the present disclosure. These are, of course, merely examples and are not intended to be limiting.

The particular implementations are merely illustrative of specific configurations and do not limit the scope of the claimed implementations. Features from different implementations may be combined to form further examples unless noted otherwise. Various implementations are illustrated in the accompanying drawing figures, where identical components and elements are identified by the same reference number, and repetitive descriptions are omitted for brevity.

Variations or modifications described in one of the implementations may also apply to others. Further, various changes, substitutions, and alterations can be made herein without departing from the spirit and scope of this disclosure as defined by the appended claims.

While the disclosure aspects are described primarily in the context of a cloud-based service, it should also be appreciated that they may apply to a service provided on-premises to the user. In particular, aspects of this disclosure may similarly apply to the management or remote management of a cloud-based service or a locally hosted service.

Synthetic monitoring is an automated approach to emulating user interactions with computer systems. It may emulate user interactions with websites, applications (e.g., web applications, standalone applications, or other applications), cloud services, or other computer services. For example, synthetic monitoring may show and evaluate what a user is experiencing when interacting with a computer system.

Synthetic monitoring can promote performance, availability, and reliability that meet or exceed expectations. For example, in the context of a web application, synthetic monitoring may include monitoring the web application using web browser emulation or scripted recordings of web transactions to simulate user interaction with the web application and thereby test attributes or features of the web application or computer system supporting the web application.

By simulating customer behavior, synthetic monitoring may proactively test computerized services (e.g., cloud-based services) and safeguard service level agreements (SLAs) to maintain a consistent and positive end-user experience. This type of monitoring may be beneficial for evaluating functionalities and identifying issues potentially before real users are affected, allowing providers to conduct tests globally at any time, which may be particularly helpful for validating service quality across different regions or before rolling out new features. Synthetic monitoring may provide basic insights, such as uptime and response times, and confirm basic functionalities like service operation and latency.

Certain implementations of this disclosure provide a synthetic monitoring platform that utilizes a container image to create customizable execution environments that meet specific customer objectives. Users may define these customizable execution environments within containers. The container may include the desired synthetics (e.g., workflows, which could be implemented as scripts), and the container may be used to schedule and run the synthetics. Using containers may also provide for version control and tracking historical changes to the execution environment.

For example, certain implementations allow the synthetic monitor environment and execution environment to be part of a user's Source Configuration Management (SCM), such as GitHub or the like, and Continuous Integration (CI) and Continuous Development (CD) pipeline, such as GitHub or the like. In certain implementations, the containers embed the synthetic code with traceability information for a user.

In certain implementations, containers undergo an attestation process to validate the container. Validation may include validating that the container works or validating that the container is safe to use on the synthetic monitoring platform. The defined container images can be stored locally to reduce reliance on external systems. The synthetic monitoring platform may allow users to select monitor types, input code logic, set configurations, schedule monitoring, validate operations pre-deployment, and establish alerting rules.

Certain implementations include an enhanced synthetic monitoring platform that provides a comprehensive perspective and gauges the end-to-end success of complex user tasks and customer experience.

Certain implementations may provide in-depth analysis of complex functionalities involving multiple simulated interaction steps or operations.

Certain implementations may provide a broader view of comprehensive service performance or interaction between various system components. For example, if a user performs periodic tasks like quarterly firmware updates, issues introduced between these periods could go unnoticed using existing synthetic monitoring, hence the importance of artificial traffic simulation for early detection.

FIG. 1 illustrates a block diagram of an example cloud-based system 100, according to certain implementations. Cloud-based system 100 includes a first computing device 102 and a second computing device 104. Each computing device includes a hardware component 112 and a software environment 114, which may (or may not) be arranged as shown. Cloud-based system 100 may include additional components that are not shown.

In an implementation, the first computing device 102 hosts a service 116. Service 116 can be implemented as a cloud-based solution maintained and operated by a cloud service provider 120. The cloud-based system offers the advantages of scalability, reliability, and accessibility from virtually anywhere with internet connectivity.

Service 116 leverages cloud infrastructure to deliver its functionalities, offering on-demand scalability, ubiquitous access, and managed upkeep. The cloud-based service can reside in a secure, remote data center where resources such as storage, processing power, and networking components are abstracted from the end user and managed by the cloud service provider 120. The cloud-based solution allows for rapid provisioning or de-provisioning of resources to match user demand, which can be accessed over the internet, facilitating seamless interaction from any location.

Service 116 provides functions tailored to meet specific business objectives, such as managing customer data, executing transactions, providing communication platforms, or running analytical operations. Service 116 can be designed with user interaction in mind, maintaining an intuitive and responsive front-end interface to enable productive and satisfactory user experiences. The service's back end handles the logic, data processing, and integration with other systems or databases, ensuring the operation runs smoothly and efficiently to meet the business's and users'needs.

The second computing device 104 hosts a synthetic monitoring program 118 in an implementation. Synthetic monitoring program 118 can be implemented as a cloud-based solution maintained and operated by a cloud service provider 122. In implementations, the cloud service provider 120 and the cloud service provider 122 are the same cloud service provider. Synthetic monitoring program 118 simulates user transactions or interactions with the service 116 to evaluate its performance, availability, and reliability.

In implementations, a user can remotely operate the synthetic monitoring program 118. This allows personnel, such as IT administrators or operations teams, to manage and observe the system from disparate locations. This can be particularly beneficial for distributed teams or tasks requiring monitoring outside regular business hours. Through remote operation capabilities, users can configure synthetic monitoring tasks, review real-time performance data, receive alerts on potential issues, and analyze long-term trends for better decision-making regarding system maintenance and optimization.

Typically, synthetic monitoring uses automated tools and scripts to simulate user interactions with web services and applications. These tools act as "synthetic" customers, performing predetermined actions as a real user might, to proactively monitor and test cloud-based services'performance, availability, and reliability. Synthetic monitoring can be integral to ensuring service level agreements (SLAs) are met and that the end-user experience for cloud-based services remains high-quality and consistent.

Generally, synthetic monitoring aims to identify issues before they impact real users. It allows cloud service providers to continuously check their services'response time, functionality, and behavior from various locations worldwide, even during off-peak hours when actual user traffic may be low. This is especially useful for identifying problems that could affect users across different geographic regions or for testing new features before they are widely deployed.

Moreover, synthetic monitoring can assess the performance and functionality of system components to enhance service dependability and the user experience. When an issue arises, such as service unavailability or transaction failure, the system can send alerts to enable prompt resolution before customers detect a problem.

Synthetic monitoring is typically employed alongside real user monitoring (RUM) but differs from RUM in that it does not rely on traffic from actual users. Instead, synthetic monitoring provides a controlled environment where tests can be replicated consistently to track performance over time and under different scenarios. This can include the testing of API endpoints, the workflow of completing an online form, or any transaction a user might perform, ensuring that potential hiccups can be addressed swiftly.

Current monitoring platforms allow users to set parameters such as code logic, secret management, monitor types and configurations, scheduling, and alert rules. However, their functionality is often limited, providing insights primarily into elementary operational metrics such as service uptime, page loading, user logins, and response times. These platforms generally do not offer the capability to evaluate complex functions that require multiple interrelated operations—for instance, product downloads or multi-step server tasks.

When a process involves several sequential actions for successful completion, existing synthetic monitoring tools might not be able to verify if the entire sequence was performed accurately. They are designed to assess each step's success based on metrics like memory usage, CPU performance, or latency but cannot understand or determine system faults in the wider context.

Existing tools may confirm the operability of services, the ability of a website to present a page or manage user logins, and basic performance such as latency. However, they fall short of providing a holistic view—the logic between various services and how they perform together in sequences, including multiple operations akin to those a user might carry out.

It would be advantageous to have a synthetic monitoring solution that can provide a comprehensive perspective, piece together several steps, and gauge the end-to-end success of complex user tasks and customer experience, lacking in existing monitoring solutions.

Further, it would be advantageous to have a synthetic monitoring solution that can predict upcoming issues. The challenge of resolving such issues is closely linked to the interval between the onset of the problem and its detection. Consider customer actions that occur infrequently, such as seasonal firmware updates in remote device management, which can be scheduled quarterly. If a regression were introduced on the second day of a quarter, yet no customer attempted an update soon after, the issue might remain undetected. Accordingly, generating artificial traffic to ensure system functionality would benefit such cases. Simulating usage can help detect failures in processes, such as firmware updates, that are not used continuously, thus enabling timely detection and resolution that might otherwise be delayed until the next cycle of customer activity.

Hardware component 112 is configured to ensure minimal bottlenecks and maximal throughput during the execution of the synthetic monitoring program 118. Hardware component 112 may, for example, be implemented as a computing device. Hardware component 112 may include a multi-core, high-frequency processor, high-speed volatile memory (RAM), solid-state drives (SSD) for rapid data access, and an advanced graphics processing unit (GPU) if the benchmarking involves rendering or computing tasks that benefit from parallel processing. Additionally, cloud-based system 100 may have a robust cooling solution to maintain optimal temperatures under heavy computational loads.

In implementations, software environment 114 includes an operating system supporting the service 116 and synthetic monitoring program 118, typically configured for maximum performance. Software environment 114 may include drivers and libraries updated to the latest versions to ensure compatibility and performance optimization for the hardware component 112.

In an implementation, software environment 114 alerts one or more users of any issues related to service 116 that the synthetic monitoring program 118 is monitoring. The synthetic monitoring program 118 and the software environment 114 may also feature a feedback loop whereby the synthetic monitoring program results inform adjustments to service 116. For example, service 116 can be reconfigured or upgraded manually or automatically if a performance aspect is lacking. In advanced setups, the optimization process can be automated with software that tweaks system settings dynamically in response to performance data.

Synthetic monitoring platforms, such as cloud-based system 100, can simulate customer behavior to generate traffic, thereby providing a predictable feedback loop for verifying functionality in scenarios where traffic may not be consistent or predictable.

Take remote device management as an example: there is a vast array of potential actions, but not all follow regular patterns. While there can be many initial setup activities (i.e., “day one” concerns), there are also “day two” concerns that may arise sporadically or seasonally, such as maintenance tasks with varying frequencies. For instance, the frequency of an action like powering off a server could differ greatly. Synthetic monitoring helps ensure that infrequent or irregular operations continue to perform correctly by simulating such activities and monitoring the system’s response.

Figure 2:
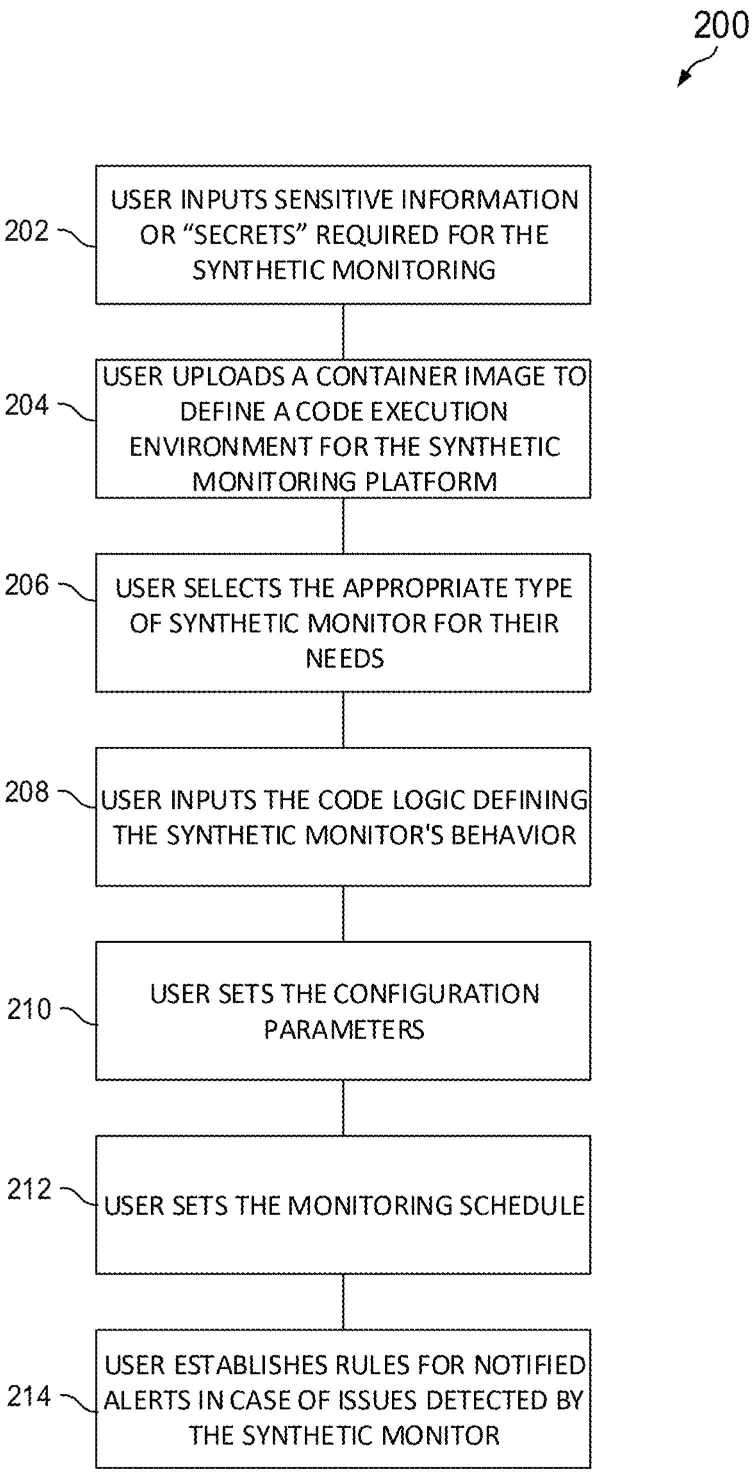
FIG. 2 is a flow chart of an implementation method for operating a synthetic monitoring platform.

FIG. 2 illustrates a flow chart of an implementation method 200 for operating a synthetic monitoring platform. It is noted that all steps outlined in the flow chart of method 200 are not necessarily required and can be optional. Further, changes to the arrangement of the steps, removal of one or more steps and path connections, and addition of steps and path connections are similarly contemplated.

At step 202, a user inputs sensitive information or “secrets” for synthetic monitoring. Secrets can include credentials, tokens, or other sensitive information that the synthetic monitor will need to access and interact with the web services or applications it tests. This step ensures the monitor has the permissions and access to function correctly and securely.

The challenges associated with existing synthetic monitoring solutions often center on their limited flexibility and need for in-depth analytical tools. Existing synthetic monitoring solutions often impose strict limitations on the types of monitors (like API, browser-based tests, or transaction monitors) available and the languages in which test logic can be written, confining users to the options supported by the platform. Consequently, organizations that require more specialized or complex monitoring cannot effectively tailor their synthetic tests. These existing solutions can become a poor fit for organizations that work with a different tech stack or need to test scenarios not covered by the provided options.

The constraint on logic language means that users might need help to accurately recreate complex user journeys or interactions that deviate from the basic use cases anticipated by the platform.

Further, existing platforms usually bundle code and secrets in a somewhat secure environment that does not provide change history. Unlike version control systems that can facilitate audit logs and revision tracking, existing synthetic monitoring platforms lack comparable capabilities. Logging can be crucial for diagnosing issues and understanding the context of failures, but limited logging means less visibility into problems when they occur. When logs are not detailed enough or lack comprehensiveness, it becomes difficult to pinpoint the reasons behind an unexpected behavior or system breakdown, which can be helpful for quick resolution and future prevention.

With a detailed record of changes, pinpointing the cause of a failure becomes easier. When a test functioning correctly at one point subsequently breaks, it’s difficult to establish whether this was due to an alteration in the test logic or a flaw within the product being tested. This inability to track historical changes creates ongoing complications in diagnosing issues with the software being monitored and the monitoring tools themselves, as neither are immune to defects. The blend of software restriction, weak logging, and absence of change tracking remains a persistent issue with existing synthetic monitoring platforms that can hamper their effectiveness.

Although existing synthetic monitoring platforms offer a method for defining a sequence of steps to be performed, these steps and solutions are typically limited within their execution environment. For instance, they may support automation using Selenium and JavaScript and offer a specified version of a single browser. This constrained approach, with a rather predefined set of tools, can present challenges.

For example, suppose a scenario where the provided synthetic monitoring platform exclusively supports Chromium, and a user’s needs pertain to Webkit or Safari, which may align with their customer base’s predominant browser preference. In such cases, the need for broader browser support limits users’ability to monitor their services effectively across their customers’different technologies.

At step 204, a user uploads a container image to define a code execution environment for the synthetic monitoring platform. This addresses the constraints of monitor type and logic within traditional platforms.

In implementations, the customizing of the synthetic monitoring to meet specific customer needs is facilitated through container images. The container images allow users to tailor the types and logic of their synthetic monitors to their unique requirements, such as particular execution environments that may involve diverse APIs and SDKs. Instead of coding these requirements directly into the synthetic monitor, users can utilize pre-configured components available “off the shelf,” incorporating them into their monitoring solutions through container images. This modularity enhances the flexibility and efficiency of creating synthetic monitors that align closely with the customer's operational environment.

In implementations, a Continuous Integration (CI) system generates the container image from code, ensuring full traceability of the synthetic monitoring code and its execution environment. Accordingly, the container image can include a traceable record of all code changes.

In implementations, users import or upload the container image as part of the platform's synthetic monitor definition. Once the user defines the container image and it is validated by the platform to be run within the platform, the platform's configuration system utilizes it to schedule and run the synthetic monitor.

The container image can be housed locally within the synthetic monitoring platform to prevent reliance on external systems and ensure robustness by minimizing dependencies. This principle of reducing externalities also applies to the management of secrets; they can be defined and stored within the synthetic monitoring platform to guarantee stability and security.

Generally, robust security measures and safety rails are expected around container attestation (i.e., validation that the container image is safe to be executed within the platform). For example, container images from the user come with risks (e.g., they could potentially be harmful or improperly constructed due to rudimentary software practices). Container image attestation is performed in implementations to address these issues. In an implementation, the container image is set to meet certain security standards the platform sets, such as various checks to ensure they are not capable of malicious actions (e.g., taking over systems or initiating denial-of-service attacks).

At step 206, the user selects the appropriate type of synthetic monitor for their needs. This could range from simple ping monitors to more complex transaction monitors. The choice depends on what aspect of the service or application the user needs to monitor, such as availability, performance, or the functioning of particular features.

At step 208, the user inputs the code logic defining the synthetic monitor's behavior. This logic can define actions that simulate how real users interact with the application or service, such as logging in, navigating through web pages, or completing transactions. This step tailors the monitoring to align with expected user behaviors.

At step 210, the user sets the configuration parameters. These parameters can define technical monitoring aspects, such as timeout thresholds, retries after failures, and regions from which the monitoring checks should be performed. These configurations ensure that monitoring is tuned to detect issues as accurately as possible.

At step 212, the user sets the monitoring schedule. The schedule can be set for different times of the day or at specific intervals to ensure regular and consistent monitoring while distributing the load on servers and minimizing performance impact.

Before deployment, the user validates the synthetic monitor to ensure it operates as intended. This validation involves running tests to ensure the monitor is set up correctly and capable of alerting the user to potential issues. It helps prevent false positives or negatives that could arise due to misconfigurations.

At step 214, the user establishes rules for notified alerts in case of issues detected by the synthetic monitor. The user sets up criteria and thresholds for when alerts should be sent out, determining how to notify relevant personnel of detected issues. This step ensures timely responses to incidents discovered by the synthetic monitoring solutions.

The alert notification system within the synthetic monitoring platform can be customizable and flexible for notification distribution. For example, the system can be integrated with various services and platforms, sending alerts through multiple channels. For instance, an alert triggered by the synthetic monitoring platform could be dispatched via PagerDuty, sent to platforms that handle incoming events, or directed through a combination of these services. Communication platforms can be configured to securely receive and manage these alerts, ensuring that the appropriate response mechanisms and parties are quickly and reliably activated and notified when an issue is detected.

The alerting rules within the synthetic monitoring platform can be designed to be customizable. For example, a user may configure the system to trigger an alert if a failure occurs simultaneously across all regions or if a certain number of failures are detected consecutively. This is to account for ephemeral issues that may resolve on their own or are caused by factors beyond the user's control. By setting such parameters, the goal is to avoid unnecessary alerts, ensuring that on-call personnel who carry pagers around the clock are not inundated with false alarms, thereby maintaining the credibility and effectiveness of real alerts.

Figure 3:
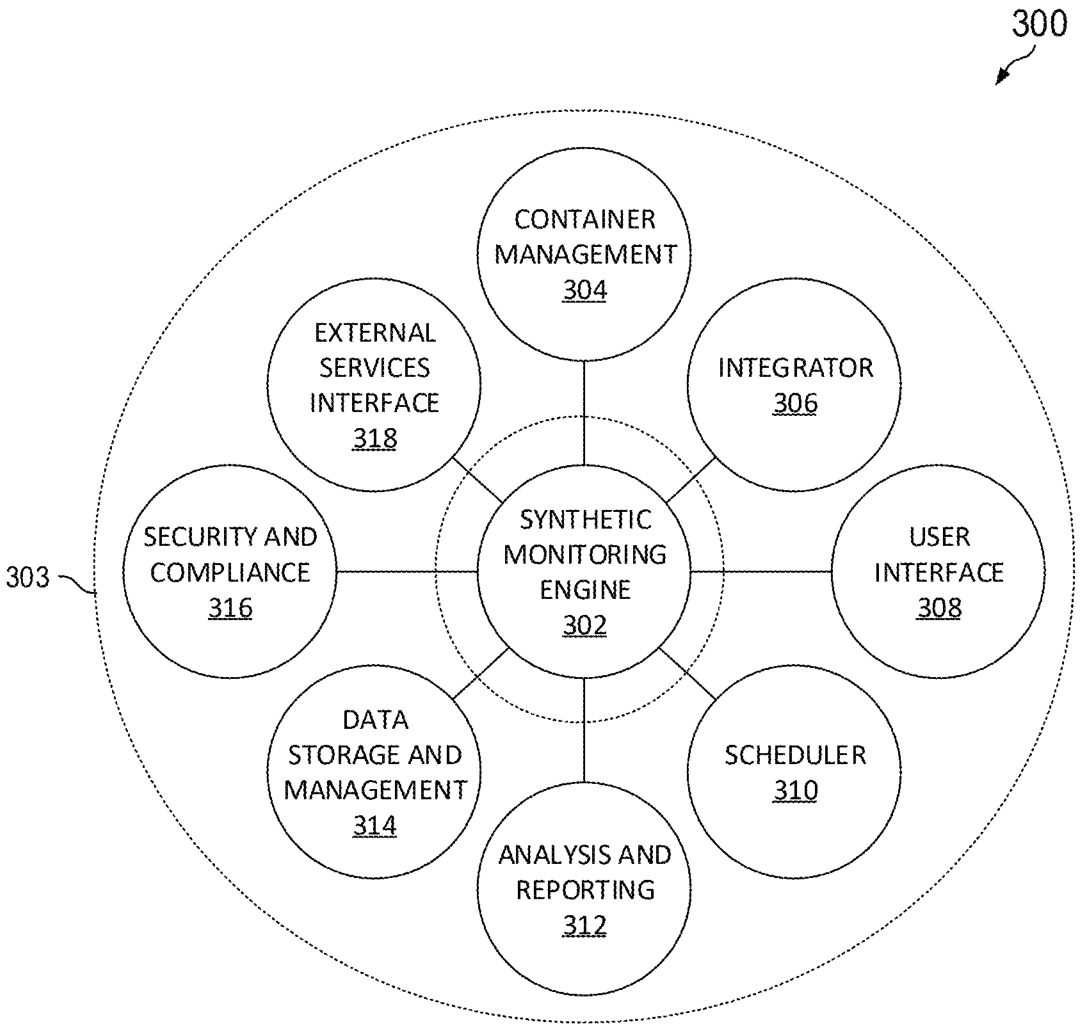
FIG. 3 is a diagram of an implementation system architecture for a synthetic monitoring platform.

FIG. 3 illustrates a diagram of an implementation system architecture 300 for a synthetic monitoring platform. The system architecture 300 includes a synthetic monitoring engine 302 and multiple subsystems 303.

In implementations, the subsystems 303 include a container management subsystem 304, an integrator subsystem 306, a user interface subsystem 308, a scheduler subsystem 310, an analysis and reporting subsystem 312, a data storage and management subsystem 314, a security and compliance subsystem 316, and an external services subsystem 318, which may (or may not) be arranged as shown. System architecture 300 may include additional components not shown. In implementations, each subsystem may be connected directly with any other subsystem.

The synthetic monitoring engine 302 can function as the central hub for monitoring activities within the synthetic monitoring platform. The synthetic monitoring engine 302 can coordinate and manage the various aspects of synthetic monitoring, acting, for example, as the point of control and data flow. The synthetic monitoring engine 302 can directly interface with all other subsystems 303, orchestrating their operations to ensure seamless monitoring. The synthetic monitoring engine 302 can receive inputs from the user, process requests, delegate tasks to appropriate subsystems 303, and collate results for analysis and reporting. The synthetic monitoring engine 302 can handle multiple monitoring tasks simultaneously.

The container management subsystem 304 can create, validate, and execute customized container environments. The container management subsystem 304 can oversee the entire lifecycle of container environments, from creation to execution. The container management subsystem 304 can allow users to define and build custom containers that capture specific monitoring scripts and dependencies. The container management subsystem 304 can manage the validation process, ensuring that each container meets the platform's safety and functionality standards before deployment. During execution, the container management subsystem 304 can monitor container performance and resource usage, ensuring optimal operation of the synthetic monitoring tasks within the isolated environments.

The integrator subsystem 306 can bridge the synthetic monitoring platform and external systems, such as Source Configuration Management (SCM) tools and Continuous Integration/Continuous Deployment (CI/CD) pipelines. It can facilitate data exchange and workflow integration, allowing users to incorporate synthetic monitoring into their existing development and deployment processes. The integrator subsystem 306 can handle authentication, data translation, and communication protocols for smooth interaction with the external systems, enabling features such as version control of monitoring scripts and automated deployment of updates.

The user interface subsystem 308 can provide the front-end experience for users of the synthetic monitoring platform. The user interface subsystem 308 can offer access points for users to interact with the synthetic monitoring platform, allowing the users to configure monitors, input code logic for custom tests, and establish alerting rules. The user interface subsystem 308 can translate user inputs into actionable instructions for the synthetic monitoring engine 302 and other subsystems 303. It can present monitoring results, alerts, and system status information in a clear and comprehensible format, ensuring users can easily understand and act on the data provided by the synthetic monitoring platform.

The scheduler subsystem 310 can manage the temporal aspects of synthetic monitoring tasks. The scheduler subsystem 310 can allow users to define when and how often specific monitoring activities should occur. The scheduler subsystem 310 can maintain a schedule of all monitoring tasks, ensuring they are executed at the specified times and frequencies. The scheduler subsystem 310 can coordinate with the synthetic monitoring engine 302 to initiate tasks, manage recurring schedules, and handle any conflicts or overlaps in scheduling. The scheduler subsystem 310 can allow users to set up complex schedules, including one-time tests, periodic checks, and condition-based monitoring triggers.

The analysis and reporting subsystem 312 can process and transform the raw data collected from monitoring activities into actionable insights. The analysis and reporting subsystem 312 can apply various analytical techniques to identify patterns, anomalies, and trends in the monitoring data. The analysis and reporting subsystem 312 can generate reports that provide users with a clear understanding of system performance, availability, and potential issues. The analysis and reporting subsystem 312 can perform predictive analysis to forecast potential future issues based on historical data and current trends, allowing for proactive system management.

The data storage and management subsystem 314 can serve as the central repository for data within the synthetic monitoring platform. The data storage and management subsystem 314 can securely store container images, ensuring they are readily available for deployment. The data storage and management subsystem 314 can maintain historical monitoring data, allowing for long-term trend analysis and compliance reporting. The data storage and management subsystem 314 can implement data management practices, including encryption, access controls, and regular backups. The data storage and management subsystem 314 can handle large volumes of data efficiently, providing quick access for real-time monitoring and supporting in-depth historical analysis.

The security and compliance subsystem 316 maintains the integrity and trustworthiness of the synthetic monitoring platform. The security and compliance subsystem 316 can implement and enforce security measures across operations, ensuring data protection and user privacy. The security and compliance subsystem 316 can manage user authentication and authorization, monitor potential security threats, and ensure compliance with relevant data protection regulations. The security and compliance subsystem 316 can oversee the security aspects of container validation, verifying that containers do not pose security risks before they are approved for use on the synthetic monitoring platform.

The external services subsystem 318 can facilitate the connection between the synthetic monitoring platform and external systems and applications being monitored. The external services subsystem 318 can manage the communication protocols and interfaces that interact with external services, such as web applications, cloud services, and APIs. The external services subsystem 318 can initiate synthetic transactions, collect response data, and report this information to the synthetic monitoring engine 302. The external services subsystem 318 can handle many protocols and service types, ensuring the platform can effectively monitor complex, multi-tiered applications and services.

Figure 4:
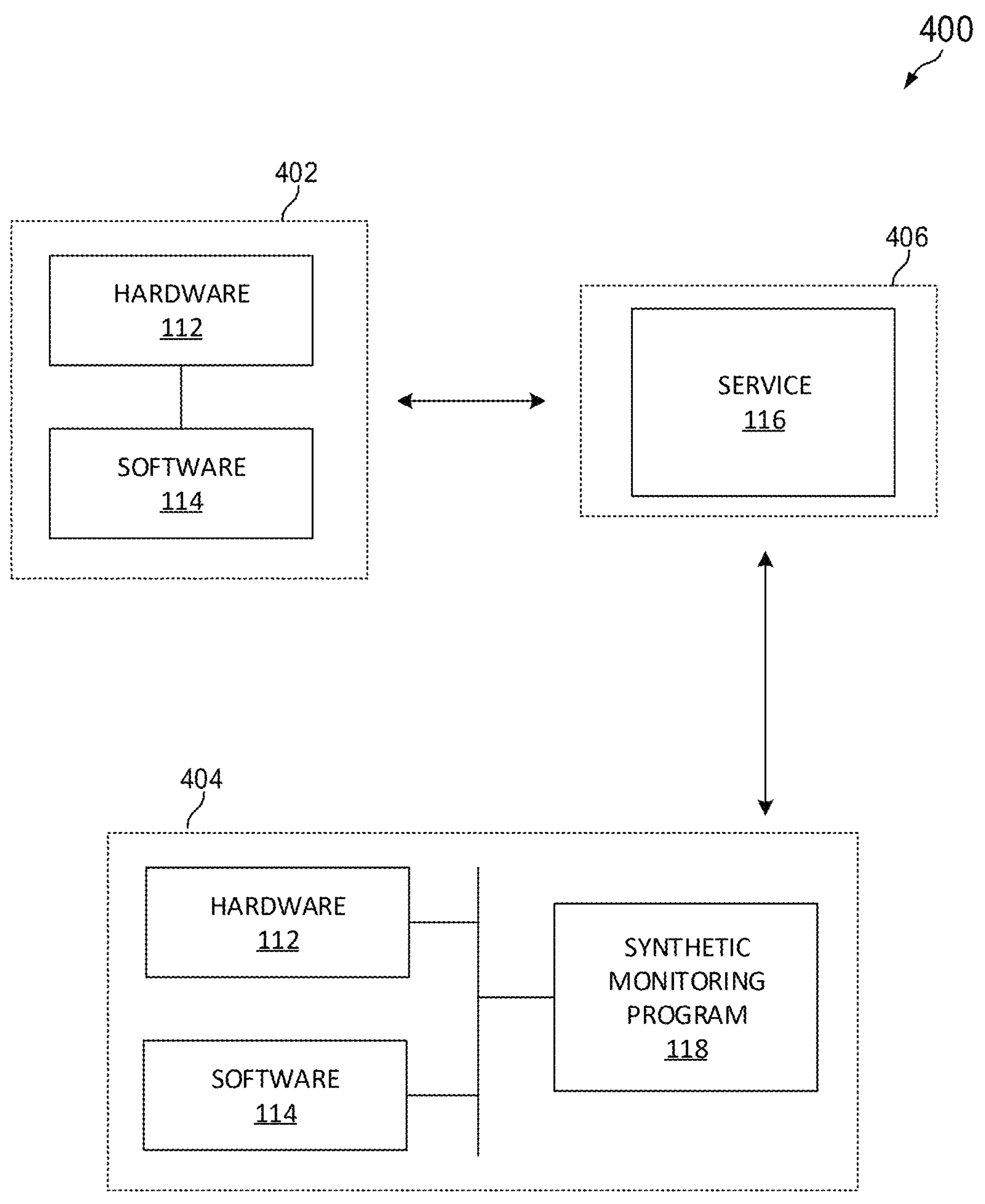
FIG. 4 is a block diagram of an example locally hosted system.

FIG. 4 illustrates a block diagram of an example locally hosted system 400, according to certain implementations. Locally hosted system 400 includes a first computing device 402 and a second computing device 404. Each computing device includes the hardware component 112 and the software environment 114, which may (or may not) be arranged as shown. Locally hosted system 400 may include additional components that are not shown.

Accordingly, locally hosted system 400 operates similarly to the cloud-based system 100, with the difference that locally hosted system 400 is locally based, whereas the cloud-based system 100 is cloud-based.

In an implementation, the first computing device 102 hosts the service 116. Service 116 may be locally hosted within an on-premises environment 406, providing organizations greater control over their data and system infrastructure. In implementations, the service 116 is hosted within the first computing device 402.

When the service 116 is locally hosted or "on-premises," it operates within the physical confines of an organization's data centers or server rooms. The organization's IT department oversees the service's hardware and software, ensuring full control over its configuration, security, and data governance.

The second computing device 404 hosts the synthetic monitoring program 118 in an implementation. This program simulates user transactions or interactions with the service 116 to evaluate its performance, availability, and reliability.

To avoid redundancy, the hardware component 112, the software environment 114, service 116, and the synthetic monitoring program 118, which were previously elaborated upon in the discussion of FIG. 1, will not be described in detail again.

Figure 5:
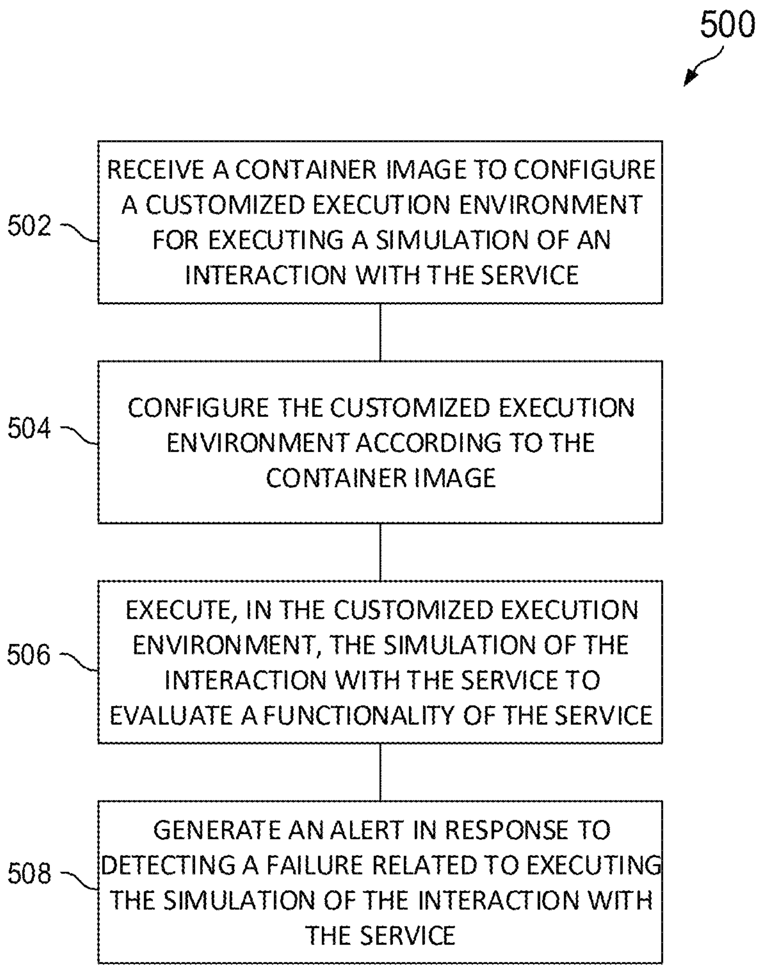
FIG. 5 is a flow chart of an implementation method for operating a synthetic monitoring platform to monitor a service.

FIG. 5 illustrates a flow chart of an implementation method 500 for operating a synthetic monitoring platform to monitor a service. It is noted that all steps outlined in the flow chart of method 500 are not necessarily required and can be optional. Further, changes to the arrangement of the steps, removal of one or more steps and path connections, and addition of steps and path connections are similarly contemplated.

In implementations, method 500 is implemented as instructions executed by a processor within a computer system.

At step 502, a container image is received to configure a customized execution environment for executing a simulation of an interaction with the service. In implementations, the container image is generated by a user.

The container images allow users to tailor the types and logic of their synthetic monitors to their unique requirements, such as particular execution environments that may involve diverse APIs and SDKs. Users can utilize pre-configured components available "off the shelf," incorporating them into the monitoring solutions through container images.

In implementations, a Continuous Integration (CI) system generates the container image from code, ensuring full traceability of the synthetic monitoring code and its execution environment. Accordingly, the container image can include a traceable record of all code changes.

In implementations, users import or upload the container image as part of the platform's synthetic monitor definition. Container image attestation is performed in implementations to address security related issues. In an implementation, the container image is set to meet certain security standards the platform sets, such as various checks to ensure they are not capable of malicious actions (e.g., taking over systems or initiating denial-of-service attacks).

At step 504, the customized execution environment is configured according to the container image. The customized execution environment can include setting parameters that define technical monitoring aspects, such as timeout thresholds, retries after failures, and regions from which the monitoring checks should be performed.

The appropriate type of synthetic monitor can range from simple ping monitors to more complex transaction monitors. The choice depends on what aspect of the service or application the user needs to monitor, such as availability, performance, or the functioning of particular features.

After customization, the user validates the synthetic monitor to ensure it operates as intended, which can involve running tests to ensure the monitor is set up correctly and capable of alerting the user to potential issues.

At step 506, the simulation of the interaction with the service is executed within the customized execution environment to evaluate the service's functionality. The execution may be scheduled for different times of the day or at specific intervals to ensure regular and consistent monitoring while distributing the load on servers and minimizing performance impact.

At step 508, an alert is generated in response to detecting a failure related to executing the simulation of the interaction with the service. In implementations, the alerts are customizable and flexible for notification distribution.

For example, a user can set up criteria and thresholds for when alerts should be sent out, determining how to notify relevant personnel of detected issues.

For example, the system can be integrated with various services and platforms, sending alerts through multiple channels. For instance, an alert triggered by the synthetic monitoring platform could be dispatched via PagerDuty, sent to platforms that handle incoming events, or directed through a combination of these services. Communication platforms can be configured to securely receive and manage these alerts, ensuring that the appropriate response mechanisms and parties are quickly and reliably activated and notified when an issue is detected.

For example, a user may configure the system to trigger an alert if a failure occurs simultaneously across all regions or if a certain number of failures are detected consecutively.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Where appropriate, any suitable operation or sequence described or illustrated herein may be interrupted, suspended, or otherwise controlled by another process, such as an operating system or kernel. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. Therefore, the appended claims are intended to encompass any such modifications or implementations.

What is claimed is:

1. A computer system for synthetic monitoring of a service, the computer system comprising:

a non-transitory computer-readable storage media configured to store programming instructions; and a processor coupled to the non-transitory computer-readable storage media, wherein the programming instructions, when executed by the processor, cause the processor to:

receive a container image to configure a customized execution environment for executing a simulation of a user interaction with the service, configure the customized execution environment according to the container image, execute, in the customized execution environment, the simulation of the user interaction with the service to evaluate a functionality of the service, and generate an alert in response to detecting a failure related to executing the simulation of the user interaction with the service.

2. The computer system of claim 1, wherein the service is a cloud service or a local service.

3. The computer system of claim 1, wherein the customized execution environment includes setting parameters defining technical monitoring aspects.

4. The computer system of claim 3, wherein the technical monitoring aspects include timeout thresholds, retries after failures, regions from which monitoring check is to be performed, or a combination thereof.

5. The computer system of claim 1, wherein an execution of the simulation of the user interaction with the service is scheduled for different times of day or at specific intervals.

6. The computer system of claim 1, wherein the alert is generated in response to the failure occurring simultaneously across all regions or if a certain number of failures are detected consecutively.

7. The computer system of claim 1, wherein the programming instructions, when executed by the processor, cause the processor to validate the container image before configuring the customized execution environment.

8. A computer-implemented method for synthetic monitoring of a service, the computer-implemented method comprising:

receiving, by a computer system, a container image to configure a customized execution environment for executing a simulation of a user interaction with the service;

configuring, by the computer system, a customized execution according to the container image; and executing, by the computer system, the simulation of the user interaction with the service in the customized execution environment to evaluate a functionality of the service.

9. The computer-implemented method of claim 8, wherein the service is a cloud service or a local service.

10. The computer-implemented method of claim 8, further comprising generating, by the computer system, an alert in response to detecting a failure related to executing the simulation of the user interaction with the service.

11. The computer-implemented method of claim 8, wherein the computer system is hosted locally.

12. The computer-implemented method of claim 8, wherein the computer system is hosted remotely.

13. The computer-implemented method of claim 8, further comprising performing container image attestation based on predefined security standards.

14. The computer-implemented method of claim 8, wherein the customized execution environment includes setting parameters defining technical monitoring aspects, and wherein the technical monitoring aspects include timeout thresholds, retries after failures, regions from which monitoring check is to be performed, or a combination thereof.

15. A method, comprising:

inputting sensitive information to gain access to a functionality of a synthetic monitoring platform for monitoring a service;

selecting synthetic monitoring type, a code logic defining a simulation of a user interaction with the service, one or more configuration parameters, scheduling parameters, or a combination thereof;

setting rules to generate alerts in response to detecting a failure related to executing the simulation of the user interaction with the service; and generating a container image to configure a customized execution environment for executing the simulation of the user interaction with the service; and uploading the container image to the synthetic monitoring platform.

16. The method of claim 15, wherein the service is a cloud service or a local service.

17. The method of claim 15, wherein generating the container image comprises generating the container image from traceable code by a continuous integration (CI) system.

18. The method of claim 15, wherein the code logic defines a series of actions that simulate how real users interact with the service.

19. The method of claim 15, wherein a configuration parameter comprises timeout thresholds, retries after failures, and regions from which the monitoring checks should be performed.

20. The method of claim 15, further comprising validating the container image before uploading to the synthetic monitoring platform.

* * * * *